United States Patent [19]

Gamble

[11] Patent Number: 5,226,345
[45] Date of Patent: Jul. 13, 1993

[54] PORTABLE GUIDE FOR HAND POWER SAWS

[76] Inventor: Timothy Gamble, 2158 Cove Park, Kemah, Tex. 77565

[21] Appl. No.: 862,718

[22] Filed: Apr. 3, 1992

[51] Int. Cl.$^5$ .............................................. B27B 9/04
[52] U.S. Cl. ...................................... 83/745; 83/761; 83/574
[58] Field of Search ............... 83/745, 761, 455, 574; 33/430, 446, 482

[56] References Cited

U.S. PATENT DOCUMENTS

| 821,959 | 5/1906 | Oxnam | 83/761 |
| 3,124,175 | 3/1964 | McCloud | 83/463 |
| 3,913,440 | 10/1975 | Baker | 83/745 |
| 4,054,077 | 10/1977 | Gram | 83/745 |
| 4,056,028 | 11/1977 | Patterson | 83/745 |
| 4,065,114 | 12/1977 | Pennington | 83/745 |
| 4,244,118 | 1/1981 | Matuszak | 83/745 |
| 4,306,479 | 12/1981 | Eberhardt | 83/745 |
| 4,494,434 | 1/1985 | Young | 83/745 |

Primary Examiner—Frank T. Yost
Assistant Examiner—Allan M. Schrock

[57] ABSTRACT

A saw guide for use with a hand power saw comprising in combination a guiding platform with two generally planar edges which underlie or form two guiding edges for guiding the shoe plate of a hand power saw across a workpiece to make cuts at various angles, and two workpiece guide bars; one guide bar is generally stationary, engaging the end surface of a workpiece to initially align the guide; the other guide bar is slideable, engaging the opposite end surface of a workpiece. The sliding guide bar is releasably clamped in position. Both guide bars work in unison to hold the saw guide in relation to both workpiece edges, allowing the saw guide to slide along the top surface of a workpiece, but not swivel out of position. Two kerf gauges are slideably interlocked at both ends of the stationary guide bar. These gauges measure a cut line along both the top surface and edge surface of a workpiece. These gauges are easily swapped or replaced for use with different power saws, blades or blade tilts. These gauges may be used for quick and accurate alignment of the saw guide.

5 Claims, 6 Drawing Sheets

PORTABLE GUIDE FOR HAND POWER SAWS

BACKGROUND OF THE INVENTION

1. Field of the Invention

This invention relates in general to saw guides, and in particular to a portable saw guide for use with hand power saws.

2. Description of Related Art

Making an accurate, smooth cut in a workpiece with a hand held power saw has been a long standing problem. The very portability of the hand power saw, with its ability to be carried to a workpiece, limits itself since it has no precise path defined for passing through a workpiece. Some of the prior art teaches a conversion of the saw into a non-hand held power saw, closely approximating a radial arm saw, table saw or the like, but in so doing it loses its very portability.

Other prior art teaches a device which attaches to the hand power saw, but in all cases the attached guide must project beyond the shoe plate of the saw in some fashion, thus limiting its use in certain applications.

This invention relates to prior art which teaches a separation of the guide from the hand power saw, so leaving the saw itself completely unencumbered for freehand cuts if desired. In each of the prior art cases, there are problems which have not been resolved, especially for cuts of 90 degrees and 45 degrees in long, wide boards of the type used in deck construction, decorative herringbone wall construction, and the like. Also, there have been problems in determining the cut line of a saw. In order to provide background information so the invention may be completely understood and appreciated, reference may be made to a number of prior art patents as follows:

U.S. Pat. No. 4,054,077 to R. H. Gram discloses a guide which is specifically designed for 90 degree and generally 45 degree cuts and is adequate for such, however the design is such that a workpiece being cut leans against a longitudinally sliding workpiece guide which is mounted in the center of a saw guiding platform. Thus, the available guiding surface for a saw is generally half the width of the saw guiding platform, and the guiding platform itself must be generally twice as wide as a workpiece being cut, thus the device must be generally twice as wide as is necessary, becoming less portable and more awkward to use. In addition, since a workpiece leans against only one workpiece guide, the free hand of the operator must grasp the workpiece and hold it in position both laterally and longitudinally to prevent movement of the device during a cut. While somewhat awkward, this can be accomplished, as long as the operator's free hand is dextrous enough to do it, but an operator with limited mobility who is unable to grasp the workpiece could not use this device without limiting its portability.

U.S. Pat. No. 3,516,457 to S. Winters discloses a guide which is designed for 90 degree and generally 45 degree cuts, and which shows a variation to allow swiveling of the guiding platform in relation to the workpiece guide, to make various mitered cuts. This device is adequate to accomplish its desired purpose, however it embodies the same two problems addressed in U.S. Pat. No. 4,054,077 above. In addition, it does not embody a kerf index or gauge of any kind.

U.S. Pat. No. 4,306,479 to J. F. Eberhardt discloses a guide which is designed for 90 degree cuts, and is adequate for such, however it is not designed for 45 degree cuts. Also, while a semi-dextrous or non-dextrous free hand may be able to hold the device in position, it was not designed for this, and slippage would probably result. Additionally, while the device incorporates a kerf gauge, the gauge is attached to the device with screws, so is not readily swapped with different size gauges if working with saws of different shoe plate widths, different size blades, or different blade tilts.

U.S. Pat. No. 4,494,434 to R. W. Young and U.S. Pat. No. 4,056,028 to G. K. Patterson both disclose devices which guide 90 degree cuts, with modifications to accomplish miter cuts up to 45 degrees. Both are portable, appear easy to use, and contain kerf gauges, however these devices must be firmly grasped and held in position with a dextrous hand necessitating the use of the thumb. Also, if the workpiece is especially wide, the thumb would not be able to reach far enough to hold the devices in position, which could result in slippage. In addition, these devices were designed to be used by a right handed person, or different versions could be made for a left handed person, but they could not be used by both left and right handed persons. Also, U.S. Pat. No. 4,494,434 embodies a kerf gauge housing for receiving a retractable kerf gauge, which also serves as a guiding edge, which extends further beyond the workpiece than is necessary for simply guiding the power saw. This same device also embodies a number of complex curves and shapes in its parts which would make it more difficult and expensive to manufacture.

U.S. Pat. No. 3,124,175 to D. E. McCloud discloses a device which was primarily designed to guide 90 degree and 45 degree cuts, and firmly hold the workpiece in position during the cut. This device is adequate to perform this function, however the device completely encircles the workpiece, and would be awkward to use for mid cuts on long boards, especially during multiple mid cuts, which would require repetitively sliding the device over the end and along the board into position, thus wasting much time. Also, the clamping means to hold the workpiece in position consists of two opposing wedges which, being separate from the main body of the device, could be misplaced, lost, or dropped and damaged, especially during busy worksite construction. Also, this device incorporates a central sheet, sandwiched midway between the opposing U-shaped and triangular surfaces, which provides strength, but limits the workpiece to being placed on only one side of the central sheet, thus the device must be constructed generally twice the thickness of the thickest workpiece to be used, thus making the device at least twice as thick as necessary. In addition, this device does not embody a kerf index or gauge of any kind.

There are many other devices which accomplish similar results, but the above cited references come closest to the intent of the invention. Whatever their precise merits, features and advantages, none of them achieves or fulfills the purposes of the present invention.

SUMMARY OF THE INVENTION

It is an object of the present invention to provide a portable, durable, accurate and simple to use saw guide for making miter cuts with hand power saws.

It is a further object of the present invention to provide such a saw guide which is relatively inexpensive and easy to manufacture.

It is a further object of the invention to provide such a saw guide which is so constructed that it will guide at least three different angular cuts on a workpiece: the first and second on one face, and the third by turning to the opposite face of a workpiece.

It is a further object of the invention to provide such a guide whose width is generally limited to that of the widest workpiece to be cut, allowing the guide to be generally half the width of some prior guides, permitting this guide to be less awkward and more portable.

It is a further object of the invention to provide a guide which will not swivel out of position while cutting a workpiece.

It is a further object of the invention to provide a guide for use in cutting workpieces of various widths and thicknesses.

It is a further object of the invention to provide a guide which will be equally stable in cutting workpieces of wider width as compared to workpieces of more narrow width.

It is a further object of the invention to provide a guide which is better adapted to cutting workpieces in the form of long boards or planks.

It is a further object of the invention to provide a guide which does not require width readjustment for multiple cuts on workpieces of the same width.

It is a further object of the invention to provide a guide which is able to be rapidly placed into, and removed from, its cutting position on a workpiece, requiring little or no movement of the workpiece itself.

It is a further object of the invention to provide a sliding kerf gauge, made of a wearable material, which is easily and inexpensively replaced, said kerf gauge being adjustable for different makes and types of power saws, and indicating both a cut line across the top surface of a workpiece and a cut angle along the edge surface of a workpiece.

It is a further object of the invention to provide a guide which reduces the work load of the hand holding the guide, so thumb and forefingers are not required to clench the guide, so only the palm of the hand may be used to maintain the guide in position, and users with one incapacitated hand can operate the guide.

It is a further object of the invention to provide a guide which, without modification, may be used by either a left handed or right handed person.

These and other objects are accomplished by the present invention which provides a portable saw guide for use with hand power saws. The invention comprises a guiding platform with two saw guiding edges located on opposite sides of the platform. The saw guiding edges lie flush against the top surface of a workpiece, permitting the shoe plate of a hand power saw to be guided across a workpiece for a cut. Angles of 90 degrees and 45 degrees are shown, but many angled cuts are possible with variations of the invention.

The invention also comprises two workpiece guide bars, which are mounted beneath the guiding platform. One is a generally stationary workpiece guide bar which is oriented in relation to the saw guiding edges so as to guide a workpiece at the proper cutting angle, and upon which the edge of a workpiece rests. The second is a sliding workpiece guide bar, which moves along a path defined by grooves cut through the guiding platform. The sliding guide bar is moved by hand into position against the opposite edge of a workpiece. The sliding guide bar is then clamped in position by tightening two wing nuts. With the workpiece sandwiched between the two guide bars, the guiding platform is unable to swivel out of position during a cut. After the wing nuts have been tightened, the invention is easily removed from a workpiece without loosening the wing nuts and, without readjustment, can be placed and/or slid into a new position for the next cut on a workpiece of the same width.

The invention also comprises a kerf gauge system. Two sliding kerf gauges are interlocked with channels at both ends of the stationary workpiece guide bar. The kerf gauges and guide bars themselves will be cut on the respective first passes of a hand power saw, thus setting their length. The length of the kerf gauges, however, is not permanent, but may be easily adjusted by outwardly sliding the gauges or by swapping with other kerf gauges for use with different power saws, blades and blade tilts. The kerf gauges slide with enough friction to be held in position if released. Each kerf gauge indicates two cut lines: the line across the top surface of a workpiece, and the line extending down the edge surface of a workpiece, which is especially useful for gauging cuts with tilted saw blades. The kerf gauges are usually removed with finger pressure but greater pressure may be applied with a small object, such as a key or nail, inserted into the kerf gauge release holes.

In use, the operator places the workpiece on a set of sawhorses with the desired cut location near one sawhorse. A mark is made along part of the desired cut line. This mark should be on the top surface or edge surface of a workpiece, and should correspond with the kerf gauge side of the invention. The invention is then placed over the top surface of a workpiece. The wing nuts are loosened, if required, and retightened after snugly setting the sliding guide bar against a workpiece, so as to allow the invention to slide along the top surface of a workpiece without swiveling. The invention is then slid to the cut location, matching the cut line with the kerf gauge, or as desired. The cut line should be a few inches outside a supporting beam of a sawhorse, and usually parallel with it. The invention is then pressed down with a freehand so as to sandwich a workpiece between the invention and a supporting beam of a sawhorse. The other hand operates a power saw guiding the shoe plate along the saw guiding edge to accomplish a cut. It should be noted that the 45 degree edge of the invention is oriented in only one direction. A 45 degree cut in the opposite direction is accomplished by turning a workpiece to the opposite face. Although this may at first appear inconvenient, in actual use a degree of consistency is attained by always making the 45 degree cut in the same direction, which could result in a time and labor savings. For example, staggered sawhorses do not have to be realigned, and a power saw can remain on the same side of a workpiece. Also, the 45 degree edge permits this invention to be smaller than some previous inventions making this invention more portable, and more likely to be used in place of imprecise freehand cuts.

In alternate use, the operator's freehand must be slightly more dextrous. The invention is placed in position for a cut as previously stated, but without a sawhorse supporting beam under the invention. The freehand must then grasp the invention and workpiece so as to prevent the invention from sliding. The freehand has only to prevent motion in this one direction, since the guiding platform is unable to swivel out of position.

The invention may be made from plastic, metal, fiberglass or wood material.

The foregoing and other objects, advantages and characterizing features of the present invention will become clearly apparent upon a reading of the ensuing detailed description together with the accompanying drawings wherein like references denote like parts throughout the various views.

DETAILED DESCRIPTION OF THE PREFERRED EMBODIMENTS

Figure 1:
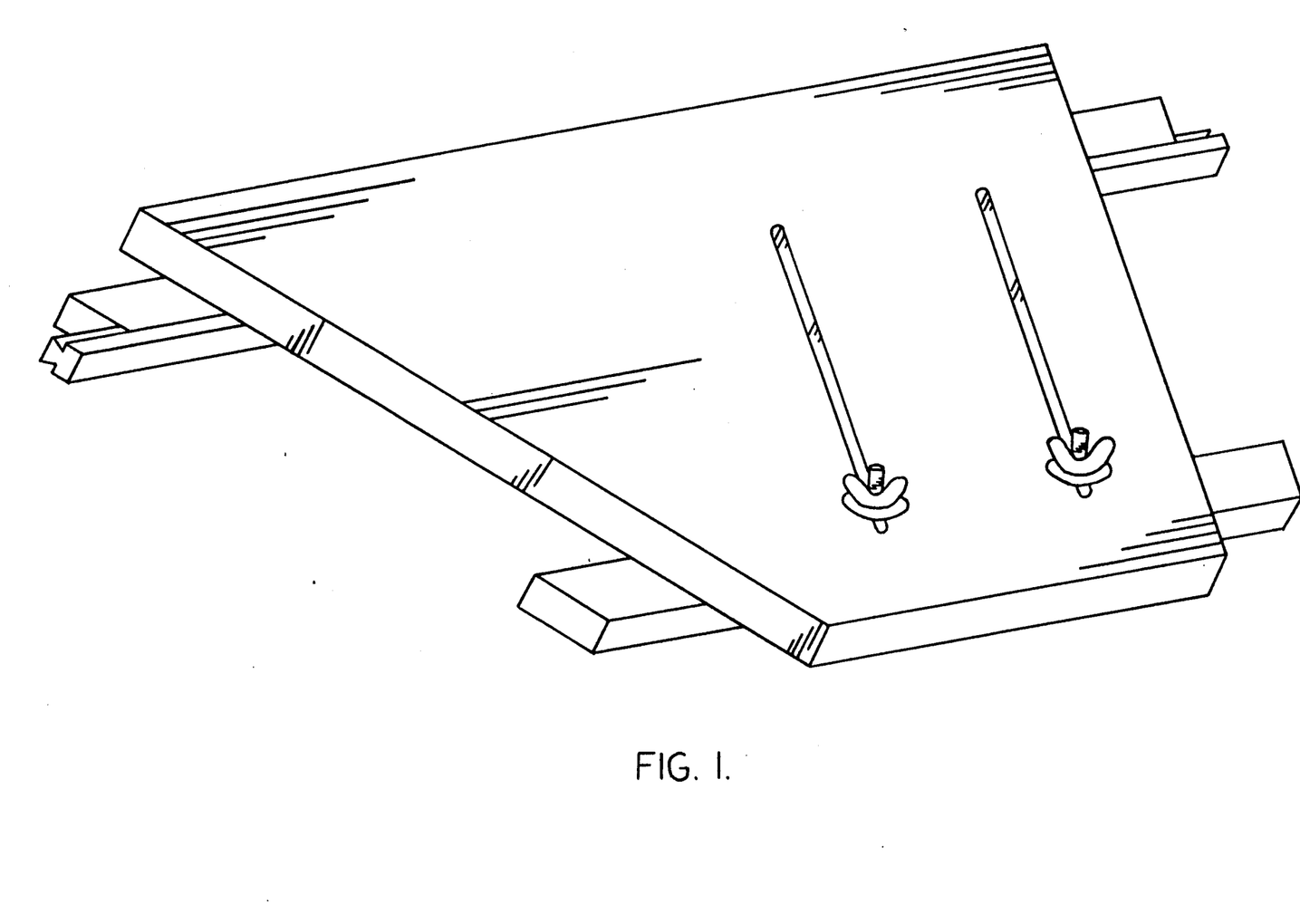
FIG. 1 is a perspective view of the saw guide.

Referring now to the drawings, a preferred embodiment of the saw guide is shown in perspective in FIG. 1. Details of FIG. 1 will be understood from the descriptions of FIGS. 2-6.

Figure 2:
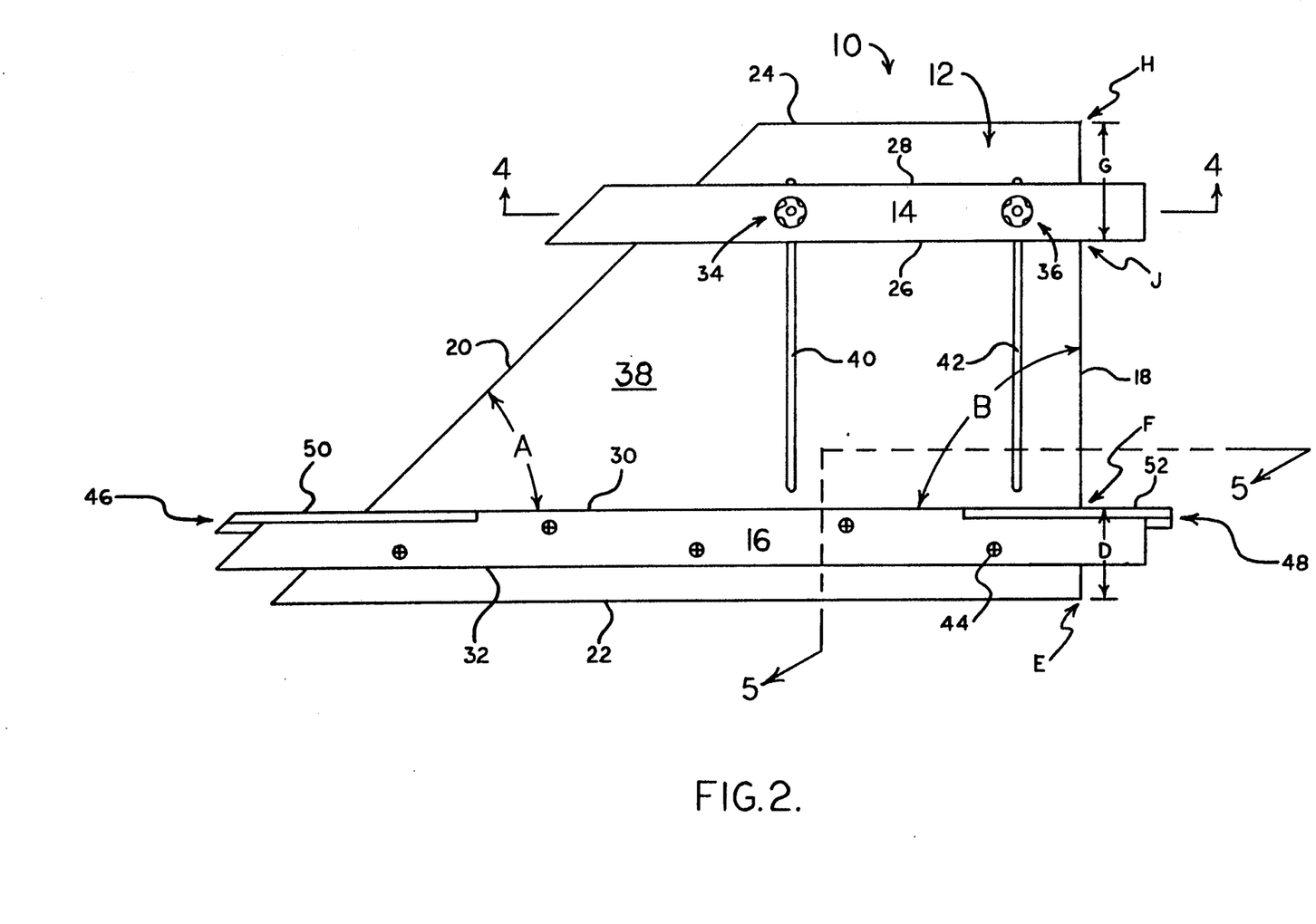
FIG. 2 is a bottom view of the saw guide.

FIG. 2 is a bottom view of the saw guide, generally designated 10, which comprises in combination a trapezoidal shaped guiding platform 12, and two workpiece guide bars 14 and 16. The guiding platform 12 has four generally planar edges 18, 20, 22 and 24, which define the periphery of the trapezoidal shaped body portion of the guiding platform 12. Planar edges 18 and 20, if smooth enough, provide a guiding edge for the shoe plate of a hand power saw which is used with the saw guide 10. If not smooth enough, a separate guiding edge may be attached. Planar edges 18 and 20 are generally not parallel to each other, however planar edges 22 and 24 are generally parallel to each other. It should be noted edges 22 and 24 are not intended to be guiding edges, so they do not have to be planar and/or parallel.

The sliding workpiece guide bar 14 and the stationary workpiece guide bar 16 each have two generally planar and parallel first edges 26, 28 and 30, 32 respectively. Inside edges 26 and 30 are the workpiece contact edges and must be generally planar. Because outside edges 28 and 32 do not contact or guide the workpiece they do not have to be planar and/or parallel.

The sliding workpiece guide bar 14 comprises two wing nut and bolt assemblies, generally designated 34 and 36, which are countersunk below the surface of guide bar 14, and will be explained in greater detail in FIG. 4. Said assemblies may be loosened to allow the sliding workpiece guide bar 14 to freely slide across guiding platform 12 along its generally planar bottom face 38. The path along which guide bar 14 moves is defined by two grooves 40 and 42, which pass completely through guiding platform 12. Said grooves are wide enough to allow free unbinding movement of the wing nut and bolt assemblies 34 and 36. Grooves 40 and 42 are generally parallel to each other. Said grooves allow the sliding guide bar edge 26 to fit flush against stationary guide bar edge 30 when no workpiece is present. Also said grooves, in the opposite direction, stop short of platform edge 24 leaving enough space to maintain the structural strength of guiding platform 12.

The stationary workpiece guide bar 16 is usually held fast to the guiding platform 12 by flush mounted screws typically designated 44. Screws 44 should be sufficient in number to perform the function of holding the stationary workpiece guide bar 16 in position. The stationary workpiece guide bar 16 comprises two kerf gauges, generally designated 46 and 48. To permit inward and outward movement, the kerf gauges 46 and 48 are slideably interlocked in a tongue and groove manner with a channel in guide bar 16. The inside edges 50 and 52, which are the workpiece contact edges, are planar and in the same plane as the inside edge 30 of guide bar 16. Kerf gauges 46 and 48 are substantially similar, and will be explained in greater detail in FIGS. 3 and 5.

The initial placement of the stationary workpiece guide bar 16 on the platform bottom face 38 is critical for three reasons: one, it partially defines cutting angle A which is 45 degrees in the preferred embodiment, two, it partially defines cutting angle B which is 90 degrees in the preferred embodiment, and three, it determines the extended guiding edge reference distance D, which is used to align the shoe plate of a power saw before the blade cuts a workpiece. Reference distance D is the distance between the end of guiding edge 18, designated point E, and the intersection of planar edges 50-30-52 with guiding edge 18, designated point F. In any configuration, reference distance D is measured along the shorter of the two saw guiding edges 18 or 20, which is edge 18 in the preferred embodiment. It should be noted that if edge 18 were to extend beyond the body of guiding platform 12, point E, being the end of edge 18, would no longer be at the intersection of edge 22. Reference distance D is an arbitrary distance, but at a minimum should allow a power saw to be slideably aligned before cutting a workpiece, assuming the power saw approaches a workpiece from the side of saw guide 10 corresponding with the stationary guide bar 16.

A similar, but variable distance G is designated at the opposite end of the shorter guiding edge, which is edge 18 in the preferred embodiment, and is defined as the distance between the end of guiding edge 18, designated point H, and the intersection of edge 18 with edge 26, designated point J. It should be noted that point H may or may not coincide with the intersection of edge 24. When sliding guide bar 14 is moved to its furthest point away from stationary guide bar 16, distance G will be at a minimum, and such minimum distance, like distance D, should allow a power saw to be slideably aligned before cutting a workpiece, assuming the workpiece is the widest useable by saw guide 10, and the power saw approaches a workpiece from the side of saw guide 10 corresponding with the sliding guide bar 14.

Figure 3:
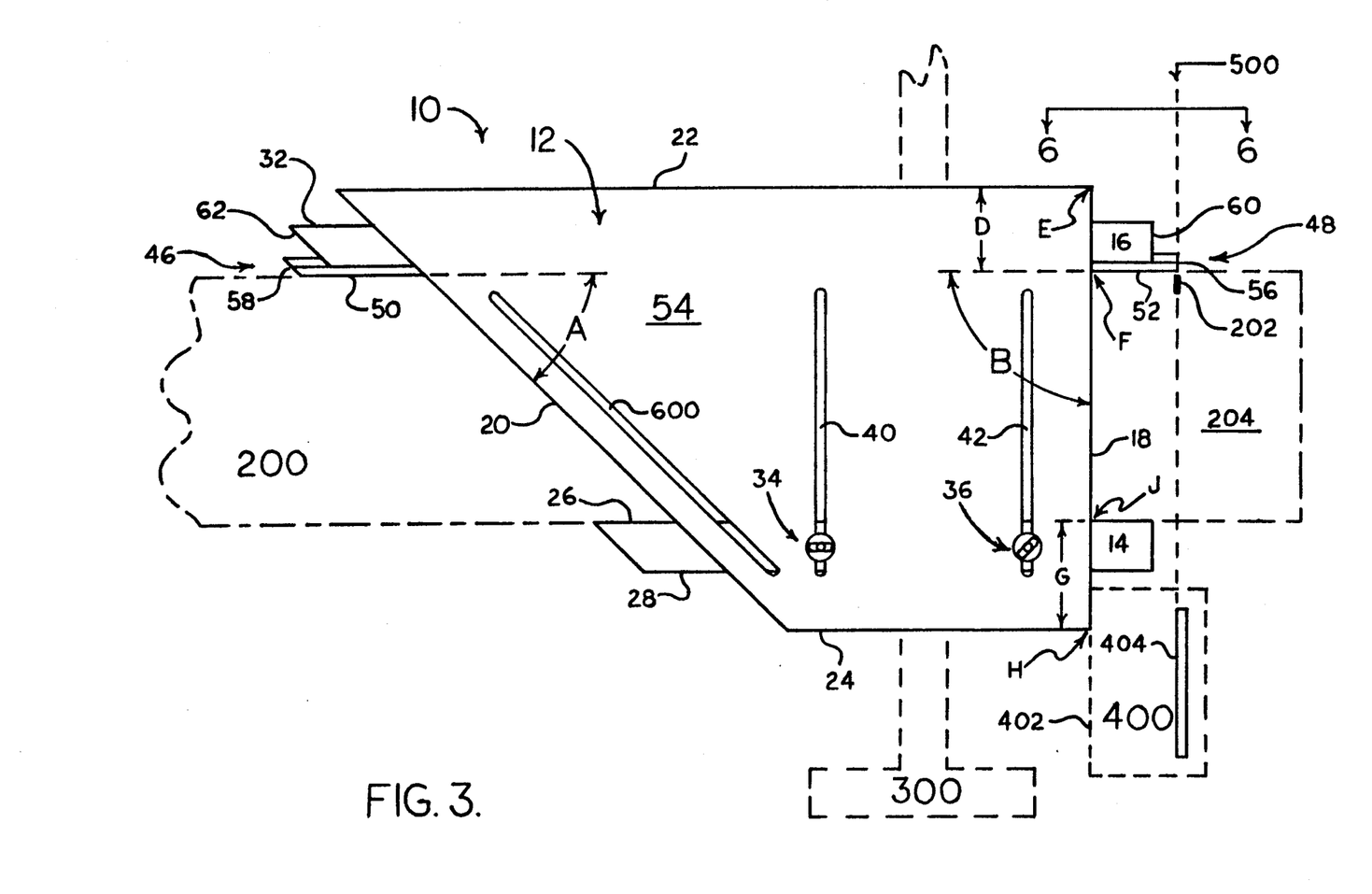
FIG. 3 is a top view of the saw guide, shown with a workpiece, a sawhorse, and a hand power saw in position for a saw cut.

Referring now to FIG. 3, which is a top view of saw guide 10, a workpiece 200 has been placed on top of a set of sawhorses, where only one sawhorse 300 is shown. The freehand of the operator is pressed down against the platform top surface 54 pinning workpiece 200 against the sawhorse 300. The hand power saw 400, specifically its shoe plate 402, is guided by edge 18 to make a cut along dotted line 500 where angle B may be any angle, but is 90 degrees in the preferred embodiment. Kerf gauge 48 is provided with a generally planar second edge 56 which has been formed by using a hand power saw 400 with saw guide 10 to accurately indicate the location of the saw blade edge 404. Once kerf gauge edge 56 has been established, the saw guide 10 is usually set in position for a cut by aligning edge 56 with a mark 202 on workpiece top surface 204, which corresponds with the desired cut line 500.

A similar procedure is performed, guided by edge 20, where angle A may be any angle, but is 45 degrees in the preferred embodiment, to provide kerf gauge 46 with a generally planar second edge 58. Please note stationary guide bar second edges 60 and 62 may or may not coincide with edges 56 and 58 respectively depending on what types and kinds of power saws, blades, and blade tilts were previously used with saw guide 10. However, when saw guide 10 is used for the first time said edges will coincide.

Even though guide bars 14 and 16 are depicted as having the same width, they do not necessarily have to be the same width, but both guide bars 14 and 16 should be the same general thickness to permit equally unobstructed passage of saw guide 10 across the top of a sawhorse 300 when slid along a workpiece top surface 204, and the workpiece 200 is nearly the same thickness as said guide bars.

A third groove 600 is depicted which serves the purpose of guiding a second sliding workpiece guide bar, which will be explained in greater detail toward the end of this section.

Figure 4:
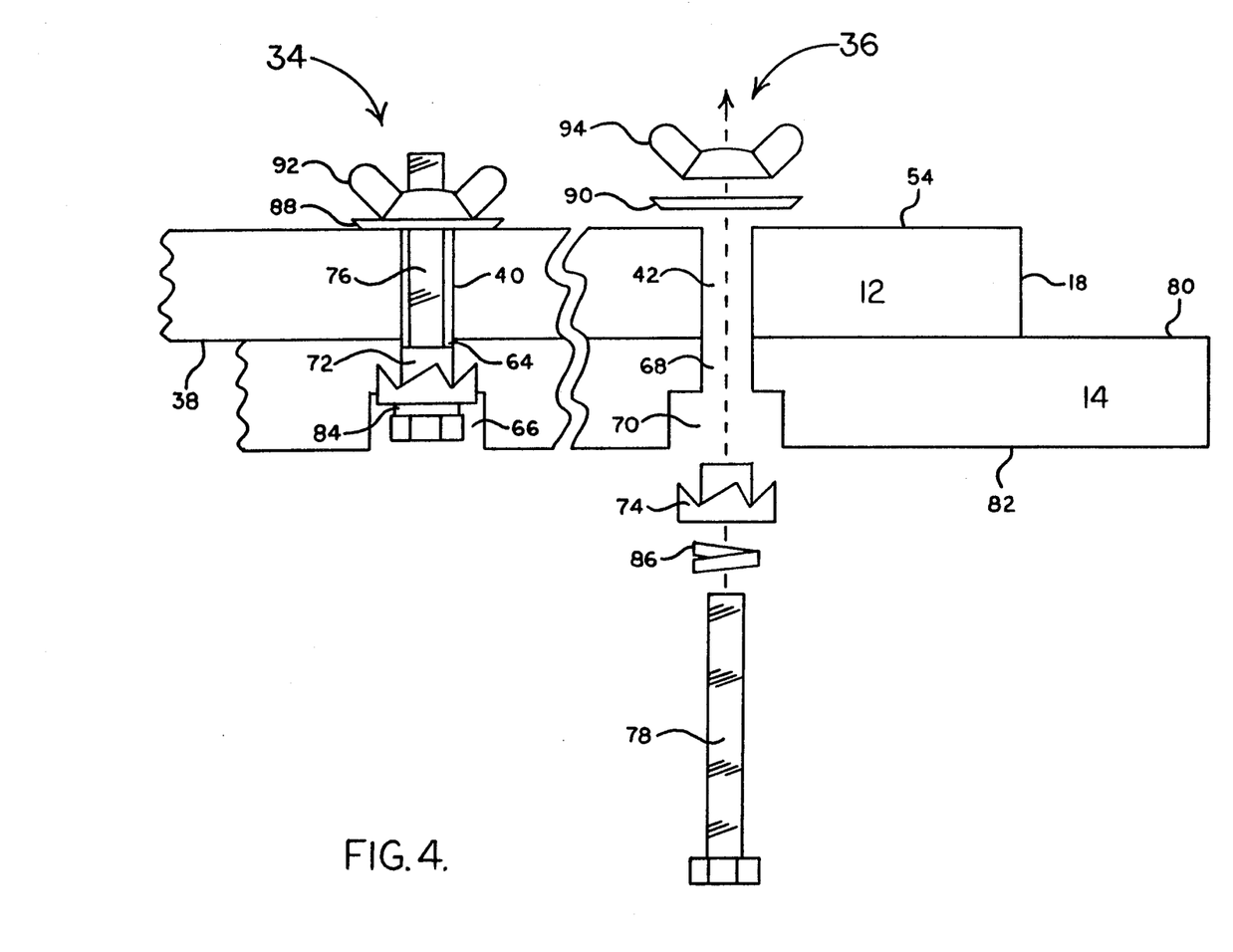
FIG. 4 is a partial side view of a cutaway section of FIG. 2 along lines 4—4, with one exploded bolt assembly.

Referring now to FIG. 4, a detailed side view of the wing nut and bolt assemblies 34 and 36 can be obtained with one assembled and the other disassembled. This figure is viewed with guiding platform 12 above, and sliding workpiece guide bar 14 below. It should be noted that grooves 40 and 42 pass completely through platform 12. The wing nut and bolt assemblies 34 and 36, when assembled, pass through grooves 40 and 42 respectively to hold sliding workpiece guide bar 14 against the bottom side of platform 12. Guide bar 14 contains two pairs of concentric holes, first pair 64 and 66, and second pair 68 and 70. The center of said hole pairs align with the center of grooves 40 and 42 respectively. The diameter of said hole pairs are designed to accept tee nuts 72 and 74 respectively. Said tee nuts are permanently imbedded in the body of guide bar 14, and contain an inner threaded surface to accept threaded bolts 76 and 78. Please note how tee nut 72 does not extend beyond guide bar surface 80, which is representative of assembled tee nut 74. However, extension beyond this is acceptable if it does not affect the smooth sliding operation of guide bar 14. Also note the depth of hole 66, which permits the head of bolt 76 to be flush or below guide bar surface 82, and is representative of hole 70. A flush or deeper mount permits greater use of the saw guide whereas a protruding bolt head could contact a sawhorse when the saw guide is slid along a workpiece. After tee nuts 72 and 74 are imbedded, the assemblies may be completed as depicted with bolts 76 and 78 passing through split ring washers 84 and 86, then threading the bolts through tee nuts 72 and 74. Guide bar 14 is positioned with protruding bolts 76 and 78 passing through grooves 40 and 42 respectively. Fender washers 88 and 90 are placed over said bolts, and wing nuts 92 and 94 are threaded into place respectively as depicted. If fender washers 88 and 90 have a side which is more conducive to a sliding operation, this smoother side should preferably face platform surface 54. It should be noted that surfaces 38, 54, 80 and 82 should all be planar and as smooth as is desirable to permit free moving operation of the saw guide. Guide bar surface 80 will slide across platform surface 38 so both must be planar and desirably smooth. Guide bar surface 82 should be planar, but could be less smooth, since it should not routinely slide across another surface, but occasionally may slide across the top surface of a sawhorse. Platform surface 54 should be planar and smooth if possible, but if not suitably smooth then a suitably smooth sliding surface should be affixed to surface 54 to permit fender washers 88 and 90 to traverse without hindrance the full operating length of grooves 40 and 42.

Figure 5:
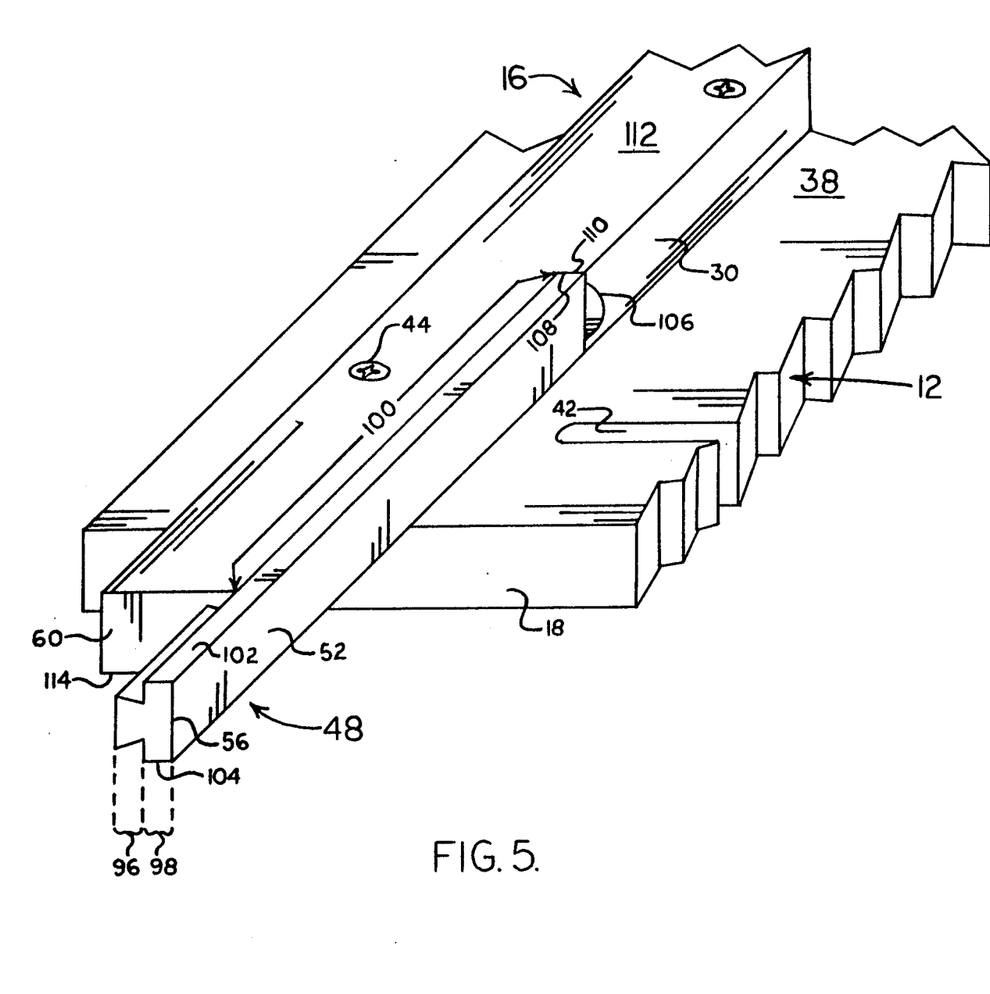
FIG. 5 is a perspective bottom end view of a broken corner of FIG. 2, broken edge marked by intersecting lines 5—5.

FIG. 5 is a perspective bottom end view of a representative section of the kerf gauge system. The shape of the end of kerf gauge 48 can now be better appreciated, but is not limited to this shape, which primarily indicates a type of shape which permits slideably interlocking the kerf gauge 48 with the stationary guide bar 16. Kerf gauge 48 is not limited to one material, but could be composed of separate and/or different materials for the key side 96 and the kerf indicator side 98. The length of channel 100 in guide bar 16 which accepts kerf gauge 48 could vary considerably depending on the type of key 96 used, and other factors. Channel 100 should be long enough to promote stability of kerf gauge 48 when set in position for use. In use, kerf gauge 48 may slide outwardly several inches to accommodate different saw kerfs, so channel 100 is usually longer than the minimum required distance for holding kerf gauge 48 stable. When sliding kerf gauge 48 outwardly, it is easiest to grip it on both sides, bottom surface 102 and top surface 104, and apply outward pressure. If kerf gauge 48 does not move, the friction lock can be overcome by applying greater pressure and/or leverage from a kerf gauge release hole 106 with a finger, car key, building nail or the like. Hole 106 is depicted as a semicircular hole in the guide bar side 30, however said hole could assume any shape or size, or could be located differently, the idea being that greater pressure and/or leverage can be applied from a gap near the inside end 108 of kerf gauge 48. The depth of hole 106 should be sufficient to perform the function of releasing a sticky kerf gauge 48. The width of hole 106 should not be excessive, the idea being that the kerf gauge inside end 108 will come to a consistent stopping point against corresponding guide bar edge 110 if fully inserted numerous times. Please note kerf gauge bottom surface 102 may be flush with stationary guide bar bottom surface 112, as may be the opposite surfaces, kerf gauge top surface 104 with guide bar top surface 114. Top surface 114 may correspond, and top surface 104 must correspond, with the top surface plane of a workpiece, and should be planar and smooth. Surfaces 102 and 112 should be planar and their smoothness should be consistent with FIG. 4 surface 82, as discussed earlier. FIG. 5 represents the ideas of the kerf gauge system which includes kerf gauge 46 in FIGS. 2 and 3.

Figure 6:
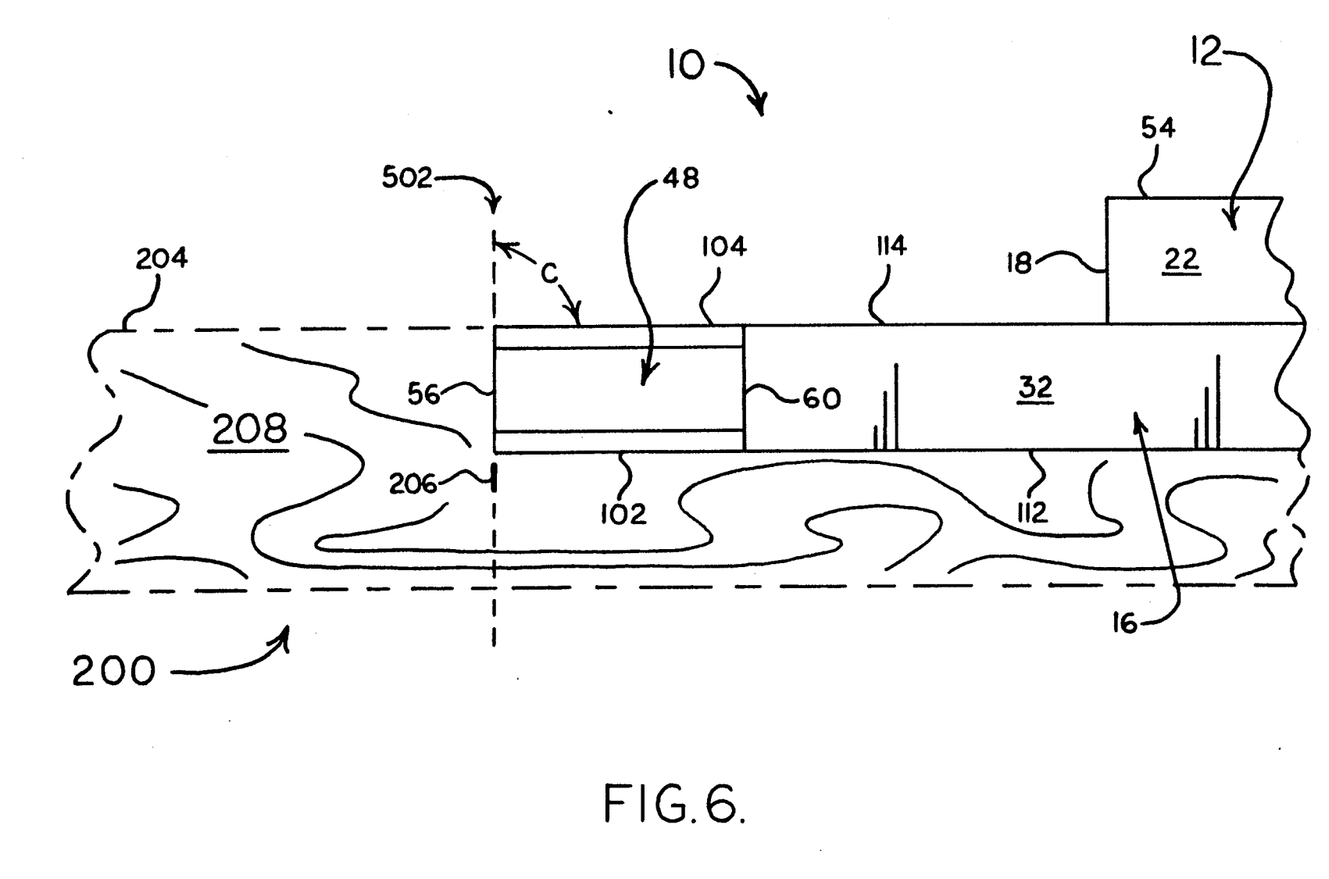
FIG. 6 is a side view of a broken section of FIG. 3, as viewed from line 6—6.

FIG. 6 is a representative side view of saw guide 10 in relation to a workpiece 200, in which kerf gauge edge 56 of kerf gauge 48 is aligned with a mark 206 on a workpiece edge surface 208 so the shoe plate of a hand power saw may be guided by edge 18 to make a cut along dotted line 502, where angle c may be any desired angle within the tilt capability of a hand power saw, being shown here as 90 degrees. FIG. 6 represents the idea of aligning the saw guide based on a workpiece edge mark, and also applies to kerf gauge 46 in FIGS. 2 and 3.

The materials used to make the saw guide may vary by part and function. With reference to FIG. 3, platform 12 may be made from wood, metal, plastic, fiberglass or other materials, it being understood that guiding platform 12 may have hollow portions formed therein when manufactured from plastic, metal or like materials. If platform 12 is made from wood, rough fiberglass or like materials the planar surface edges 18 and 20 may have to be supplemented with metal, plastic or like smooth materials for edges if not sufficiently smooth. Such edges may, for example, be affixed to platform top surface 54 forming a 90 degree angle extending down edges 18 and 20.

With reference to FIG. 4, if platform 12 is made from wood, rough fiberglass or like material, and top surface 54 is not sufficiently smooth for free unbinding movement of washers 88 and 90, a suitably smooth sliding surface made of metal, plastic or like smooth materials should be affixed to an appropriate location on surface 54 to permit free unbinding movement.

With reference to FIG. 2, guide bars 14 and 16 may be made of the same material if desired, or a composite of materials, however, the parts which extend beyond guiding edges 18 and 20 must be made of wearable materials such as wood or plastic which can be cut by a hand power saw, and preferably leaving smooth edges. If guide bar 16 is to be fixed in position, it could be a molded part of the guiding platform 12 if molded from plastic or like material. Kerf gauges 46 and 48 should also be made of a wearable material or materials. Such materials, when cut by a hand power saw, should leave a suitably smooth surface which can be used for accurate alignment of saw guide 10 with a marked workpiece. Such materials used in kerf gauges 46 and 48 are desirably, but not necessarily, weaker in comparison to the materials which hold said kerf gauges against guide bar 16. If damage were to occur while removing a kerf gauge, it would be better to damage the more easily replaced member.

The hardware used for fastening the parts of saw guide 10 should be suitably strong to perform their function as understood by those skilled in the art. If weatherability is desired, corrosion resistant hardware such as stainless steel may be used.

The above described embodiment can be modified in numerous ways, for example, by varying the saw guiding edges 18 and 20 so as to guide cuts at a different angle or angles, or opposing similar or dissimilar angles, and the like. To permit the cutting of a wedge shaped workpiece, one hole pair 64/66 or 68/70 in the sliding workpiece guide bar 14 could be elongated into a slot, the tee nut 72 or 74 replaced with a slideable surface in said slot, and the split washer 84 or 86 replaced with a flat washer, whereby the angle of the sliding guide bar 14 in relation to the stationary guide bar 16, could be varied. Building on this idea, two slots may be desired instead.

Another modification would be to supplement grooves 40 and 42 with a third groove 600 which runs parallel to guiding edge 20 through which would pass a third wing nut and bolt assembly which would be attached to a second sliding workpiece guide bar, which would connect to the first sliding workpiece guide bar via a sliding track mounted to edge 28. Said track could be of almost any sort as understood by those skilled in the art. This modification would permit the end of the sliding guide bar along edge 20 to remain equidistant from edge 20 while adjusting to different widths of workpieces. If edge 18 were also angled, the same could be done for the opposite side with a fourth groove.

Another modification could be made to the stationary guide bar 16, which could be alternatively fastened with wing nut and bolt assemblies at either end and mounted in a semicircular track at one end, or in any like manner, to permit partial swiveling of said guide bar for workpiece alignment, thus making available different angled cuts.

The above modifications are likely to be more costly to implement and/or less likely to be needed or used than the preferred embodiment as described. Said preferred embodiment is designed to be portable, durable, accurate and simple to use. Because of its simplicity in design it should be relatively inexpensive and easy to manufacture. The saw guide is capable of guiding three or more angular cuts on a workpiece. The placement of the stationary guide bar near the edge, instead of the middle, of the guiding platform permits this saw guide to be smaller, thus less awkward and more portable than some previous saw guides. The addition of a sliding guide bar prevents swiveling of the guiding platform during a cut. This saw guide may be used with workpieces of various widths and thicknesses. Wider workpieces are held just as stably as more narrow workpieces. This guide is especially well adapted to guiding cuts on workpieces in the form of long boards or planks, because of the slideable nature of the saw guide along the top surface of a workpiece, and its use with sawhorses. Multiple cuts performed on workpieces of the same width require no readjustment of the sliding workpiece guide bar. Because the saw guide only touches a workpiece on three sides, and because of its portability, it is able to be rapidly placed into, and removed from, its cutting position on a workpiece, requiring little or no movement of the workpiece itself. The kerf gauges are quickly and easily adjusted or swapped with other kerf gauges to adapt to different power saws, blades and blade tilts. Each kerf gauge indicates a cut line across the top surface of a workpiece, and across the edge surface of a workpiece. It is understood that additional kerf gauges may be supplied with the saw guide and/or purchased separately, said kerf gauges being made of inexpensive wearable materials. The saw guide is unique in that it does not require clenching or holding the guide against a workpiece, so the workload of the hand holding the guide can be reduced, and user with one incapacitated hand can operate the guide. Also, users which are left handed or right handed may operate this guide without modification.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

I claim:

1. A saw guide comprising:
  a guiding platform of a predetermined shape with two parallel grooves passing through said platform, and two planar edges on opposite sides of said platform for guiding a hand power saw; one of said edges is parallel to said grooves, and the other said edge is angled relative to said grooves;
  a first workpiece guide bar which is stationary and is fixedly mounted along the bottom face of said platform, said guide bar engaging a workpiece along an edge surface; the angle between said guide bar and said planar edges defining the angle at which said workpiece will be cut;

a second workpiece guide bar which is slideably mounted along the bottom face of said platform in said two parallel grooves, said second guide bar also engaging said workpiece but from an opposite edge surface; said second guide bar riding the edge of a workpiece without forcibly engaging a workpiece;

means for releasably clamping said second workpiece guide bar to the bottom face of said platform while engaging said edge surface of a workpiece thereby permitting both said workpiece guide bars to work in unison; said clamping means are fixedly mounted to said second workpiece guide bar, passing through said grooves and being releasably fastened from the top surface of said platform.

2. The saw guide of claim 1, wherein said first and second workpiece guide bars extend beyond said planar edges so as to be cut on the respective first passes of a hand power saw.

3. The saw guide of claim 2, wherein two kerf gauges are slideably interlocked with said first workpiece guide bar, said kerf gauges being located along the workpiece contact edge at opposite ends of said guide bar; when slid the workpiece contact edges of said kerf gauges remain in the same plane as the workpiece contact edge of said guide bar; said kerf gauges have a top surface which corresponds with the plane of the platform bottom face, which in turn corresponds with the plane of a workpiece top surface held by the saw guide;

4. The saw guide of claim 1, wherein the periphery of said guiding platform defines a trapezoid with the two parallel edges being non-guiding edges, and the two remaining edges being the said planar edges.

5. The saw guide of claim 1, wherein said planar edges form a 90 degree angle and a 45 degree angle.

* * * * *